United States Patent [19]

Nakamura et al.

[11] Patent Number: 4,636,782
[45] Date of Patent: Jan. 13, 1987

[54] DISPLAY ARRANGEMENT FOR A VEHICLE

[75] Inventors: Kenzi Nakamura, Toyota; Akio Honda, Nukata; Kazuo Inukai; Yoshito Ito, both of Nagoya, all of Japan

[73] Assignee: Nippondenso Co., Ltd., Kariya, Japan

[21] Appl. No.: 592,086

[22] Filed: Mar. 22, 1984

[30] Foreign Application Priority Data

Mar. 25, 1983 [JP] Japan .................................. 58-50809

[51] Int. Cl.4 ............................................... G09G 3/02
[52] U.S. Cl. .................................. 340/705; 340/716; 340/753; 340/52 F
[58] Field of Search ............... 340/705, 980, 691, 757, 340/52 F, 758, 760, 753, 716, 784; 350/172, 174

[56] References Cited

U.S. PATENT DOCUMENTS

| | | | |
|---|---|---|---|
| 3,848,974 | 11/1974 | Hosking et al. | 350/174 |
| 3,885,095 | 5/1975 | Wolfson et al. | |
| 3,887,273 | 6/1975 | Griffiths | |
| 4,190,832 | 2/1980 | Mohler | 340/705 |
| 4,350,411 | 9/1982 | Rogers | 350/174 |
| 4,403,216 | 9/1983 | Yokoi | 340/705 |

FOREIGN PATENT DOCUMENTS

| | | |
|---|---|---|
| 2450704 | 12/1976 | Fed. Rep. of Germany . |
| 1089574 | 3/1955 | France . |
| 1575688 | 7/1969 | France . |
| 2399335 | 3/1979 | France . |
| 643564 | 9/1948 | United Kingdom . |
| 2049984 | 4/1980 | United Kingdom . |

OTHER PUBLICATIONS

Patents Abstracts of Japan, vol. 6, No. 112 (P-124) 23rd Jun. 1982, J.P.-A-57 40 654 (Sanyo Denki K.K. ) 06 03 1982.

Primary Examiner—Gerald L. Brigance
Assistant Examiner—Jeffery A. Brier
Attorney, Agent, or Firm—Cushman, Darby & Cushman

[57] ABSTRACT

A display arrangement for displaying information perspectively or three-dimensionally has a first and second display devices. The first display device is positioned behind a semitransparent mirror and displays a first information which is directly viewed through the semitransparent mirror. The second display device is positioned to intersect the first display device at an acute angle and displays a second information downwardly. The second information from the second display device is reflected by the semitransparent mirror to be viewed indirectly. Since the virtual image of the second information is formed on a plane which is symmetric to the second display device with respect to the semitransparent mirror, it is viewed as displayed perspectively or three-dimensionally.

20 Claims, 4 Drawing Figures

DISPLAY ARRANGEMENT FOR A VEHICLE

BACKGROUND OF THE INVENTION

The present invention relates to a display arrangement, and more particularly to a display arrangements for vehicles which displays information three-dimensionally or perspectively.

Various kinds of display arrangement for vehicles have been suggested and practiced actually in vehicles. However, all of them only display information two-dimensionally on an instrument panel of a vehicle and cannot give a sense of perspective to a viewer, vehicle driver.

SUMMARY OF THE INVENTION

It is therefore a primary objective of the present invention to provide a display arrangement which is capable of displaying information perspectively or three-dimensionally.

It is a further object of the present invention to provide a display arrangement which is capable of displaying information perspectively or three-dimensionally in a vehicle instrument panel.

According to the present invention, a semitransparent mirror is provided in an instrument panel of an automobile and a display device which emits a light in the form of an information to be displayed is provided at an acute angle relative to the semitransparent mirror so that the information from the display device is reflected by the semitransparent mirror and viewed by a vehicle driver with a sense of perspective.

Another display device which emits a light in the form of another information is provided behind the semitransparent mirror so that the another information is viewed through the semitransparent mirror with a further sense of perspective.

DETAILED DESCRIPTION OF THE PREFERRED EMBODIMENT

The present invention will be described in detail with reference to an embodiment in which a display arrangement is installed in an automobile.

Figure 1:
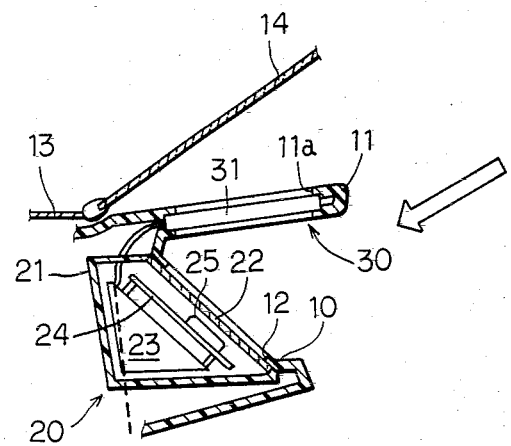
FIG. 1 is a cross-sectional view showing a display arrangement according to an embodiment of the present invention.

Referring first to FIG. 1, the display arrangement has a first and second display devices 20 and 30 provided under a windshield glass 14. The first display device 20 is securely fixed to a rear side of an instrument panel 10 in an automobile, while the second display device 30 is securely supported in an opening of a hood 11 extending from an upper portion of the instrument panel 10 toward a driver's seat (not shown) at a predetermined acute angle.

The first display device 20 has an outer casing 21 having an opening which faces an opening 12 of the instrument panel 10. A half mirror or a semitransparent mirror 22 which passes a portion of light and reflects a portion of light is sandwiched between the outer casing 21 and the instrument panel 10. The semitransparent mirror 22 may comprise a transparent glass and a thin metal coating on one side of the glass. An inner casing 23 encased in the outer casing 21 supports a panel 24 on a front side thereof in pararell with the semitransparent mirror 22. Seven-segment type light emitting elements 25 are provided on a front surface of the panel 24. The light emitting elements 25 such as light emitting diodes may be activated by a driver circuit (not shown) to numerically display a first information, an automobile speed, in green in a manner known well.

Figure 2:
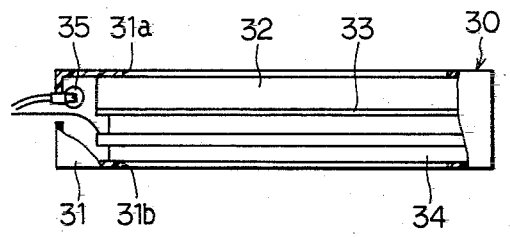
FIG. 2 is a pictorial view showing, partly in cross-section, a structure of a second display device shown in FIG. 1.

As shown in FIG. 2, the second display device 30 has a casing 31 in the opening 11a of the hood 11. A light conductive plate 32, a colored filter 33 and a two-layer transparent type liquid crystal panel 34 are stacked and encased in the casing 31 in the named order. A lamp 35 positioned adjacent to the light conductive plate 32 is also encased in the casing 31.

The light conductive plate 32 faces a top opening 31a of the casing to pass therethrough to the colored filter 33 a sun light passing through the windshield glass 14 and a light emitted by the lamp 35 which may be activated at night by a battery (not shown). The colored filter 33, receiving the light from the light conductive plate 32, changes the light to a green-colored light and passes the green light to the liquid crystal panel 34.

Figure 3:
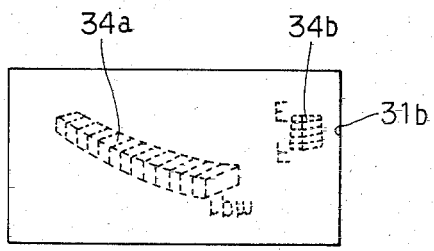
FIG. 3 is a plan view showing a pattern of electrodes of a liquid crystal panel shown in FIG. 2.

The liquid crystal panel 34 faces bottom opening 31b of the casing 31 and has electrodes 34a and 34b shaped in a predetermined pattern. The electrode pattern is in a form shown in FIG. 3 to display a second information, an engine speed and a fuel quantity, in bar graph forms. The electrodes 34a and 34b in bar graph forms generally extend between the lower and upper parts of the liquid crystal panel 34 as shown in FIG. 3, that is, between the left and right parts of the liquid crystal panel 34 in FIG. 2. The liquid crystal panel 34 cuts off the green light from the colored filter when no electric voltage is applied to the electrodes 34a and 34b, whereas it passes the same to the opening 31b in the form of electrode pattern therethrough when an electric voltage is applied to the electrodes 34a and 34b.

In operation, the first display device 20 displays the first information two-dimensionally by virtue of the green light emitted by the light emitting elements 25 and passing through the semitransparent mirror 22 so that the first information may be viewed directly in the instrument panel 10 by an automobile driver from a direction indicated by an arrow in FIG. 1. The internal structure of the first display device 20 which does not emit light except for the light emitting elements 25 is not substantially viewed by the automobile driver because of the use of the semitransparent mirror 22 which substantially passes only bright light therethrough.

Figure 4:
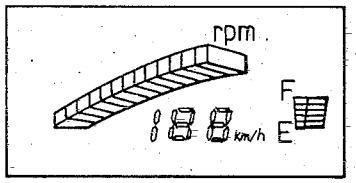
FIG. 4 is a pictorial view showing a combined display attained by a first and second display devices shown in FIG. 1.

The second display device 30 displays the second information two-dimensionally by virtue of the green light passing through or emitted from the liquid crystal panel 34 which is applied with the electric voltage. Since the second information is displayed downwardly or toward the instrument panel 10 by the second display device 30, it cannot be viewed directly by the automobile driver facing the instrument panel 10. The second information displayed thus are reflected by the semitransparent mirror 22 and viewed indirectly by the automobile driver. Thus not only the first information but also the second information are displayed in the instrument panel 10 in a combined form as shown in FIG. 4.

It should be noted here that, since the second display device 30 intersects the semitransparent mirror 22 at the acute angle, a virtual image of the second information is formed on a plane shown by a dotted line in FIG. 1. This plane is symmetric to the second display device 30 with respect to the semitransparent mirror 22. Therefore, the second information is viewed by the automobile driver as if it is displayed behind the first information. In addition, the second information in bar graph forms is viewed as if it projects toward the automobile driver, because the virtual image of the second information viewed by the automobile driver as shown in FIG. 4 is formed closer to the automobile driver and hence the virtual image of the second information is enlarged as it extends toward the upper part of the instrument panel 10. This means that the information thus displayed in the instrument panel 10 is viewed by the automobile driver as if it is displayed perspectively or three-dimensionally. The structure of the second display device 30 and parts such as the hood adjacent thereto which do not emit light except for the liquid crystal panel 34 is not viewed by the automobile driver through the semitransparent mirror 22 because the semitransparent mirror 22 substantially reflects only bright light incident thereto.

The present invention described hereinabove is not limited to the preferred embodiment but may be modified in many ways without departing from the spirit and scope of the present invention.

What we claim is:

1. A display arrangement for a vehicle having a windshield glass, an instrument panel provided below said windshield glass and in front of a driver's seat, and a hood for said instrument panel extending between said windshield glass and said instrument panel toward said driver's seat, said display arrangement comprising:
    a display device provided in said hood for displaying in a substantially downward direction information arranged in a first pattern indicative of a first condition of said vehicle, said first pattern extending in substantially the same direction as said display device extends from said instrument panel, said display device including means for providing substantially downward directed light in said first pattern; and
    a mirror panel provided in said instrument panel at an acute angle relative to said display device, said mirror panel reflecting light from said display device toward said driver's seat, in such a manner that a virtual image of said first pattern is formed in perspective behind said mirror panel.

2. A display device according to claim 1, wherein said mirror panel is a semi-transparent panel for transmission and reflection of light.

3. A display device according to claim 2, further comprising another display device provided in said instrument panel for displaying toward said driver's seat a second information arranged in a second pattern indicative of a second condition of said vehicle.

4. A display device according to claim 3, wherein said another display device is positioned behind said semi-transparent panel.

5. A display device according to claim 4, wherein said another display device is positioned in front of a plane where said virtual image is formed.

6. A display arrangement according to claim 1, wherein said second pattern is shaped in a bar graph extending diagonally.

7. A display arrangement according to claim 1, wherein said display device further includes:
    means for providing a colored light; and
    means for transmitting said colored light to said mirror panel in said second pattern.

8. A display arrangement according to claim 7, wherein said colored light providing means includes:
    a light source; and
    a colored filter for coloring light from said light source.

9. A display arrangement according to claim 8, wherein said hood has an opening through which sunlight incident through said windshield glass passes in a substantially downward direction, and wherein said colored filter is provided in said hood opening for coloring said sunlight incident thereto.

10. A display arrangement according to claim 9, further comprising a light conductive plate for transmitting light from said light source therethrough to said colored filter.

11. A display arrangement according to claim 10, wherein said transmitting means comprises a liquid crystal panel having electrodes shaped in said first pattern.

12. A display arrangement according to claim 3 wherein said another display device has a display surface that is parallel to said mirror panel.

13. A display arrangement for a vehicle having a windshield glass, an instrument panel provided below said windshield glass and in front of a driver's seat, and a hood for said instrument panel extending between said windshield glass and said instrument panel toward said driver's seat, said display arrangement comprising:
    a first display device provided in said instrument panel for displaying toward said driver's seat information arranged in a first pattern indicative of a first condition of said vehicle;
    a second display device provided in said hood for displaying in a substantially downward direction information arranged in a second pattern indicative of a second condition of said vehicle, said second display device including means for providing in a substantially downward direction light in said second pattern; and
    a mirror panel provided in said instrument panel at an acute angle relative to said second display device, said mirror panel reflecting light from said second display device toward said driver's seat in such a manner that a virtual image of said second pattern is formed in perspective behind said first display device so that said first pattern and said virtual image of said second pattern are displayed three-dimensionally in said instrument panel.

14. A display arrangement according to claim 13, wherein said hood has an opening through which sunlight incident through said windshield glass passes substantially in a downward direction, and wherein said light providing means of said second display device has a colored filter provided in said hood opening for coloring said sun light incident thereto and means for shaping said sun light from said colored filter into said second pattern.

15. A display arrangement according to claim 14, wherein said second display device includes a light source provided adjacent to said hood opening for emitting light toward said colored filter when activated, and wherein said shaping means comprises a liquid crystal panel having electrodes shaped in said second pattern.

16. A display arrangement according to claim 13, wherein said mirror panel is semitransparent, and wherein said first display device is positioned behind said mirror panel but in front of a plane where the virtual image of said second pattern is formed.

17. A display arrangement according to claim 16, wherein said second display device includes a light source provided in said hood for emitting light, and wherein said light providing means includes first means for coloring the light from said light source and second means for shaping the colored light from said first means into said second pattern 18. A display arrangement according to claim 16, wherein said second display device includes light source provided in said hood for emitting light, a light conductive plate for transmitting light from said light source therethrough, a liquid crystal panel having an electrode shaped in said second pattern, and a colored filter sandwiched between said light conductive plate and said liquid crystal panel for providing said liquid crystal panel with a colored light.

19. A display arrangement according to claim 13, wherein said second condition of said vehicle is a rotational speed of an engine in said vehicle.

20. A display arrangement according to claim 13 wherein said first display device has a display surface that is parallel to said mirror panel.

* * * * *